March 11, 1941.     C. G. KRONMILLER     2,234,376
STOKER CONTROL SYSTEM
Original Filed June 21, 1937    3 Sheets-Sheet 1

Inventor
Carl G. Kronmiller
By George H. Fisher
Attorney

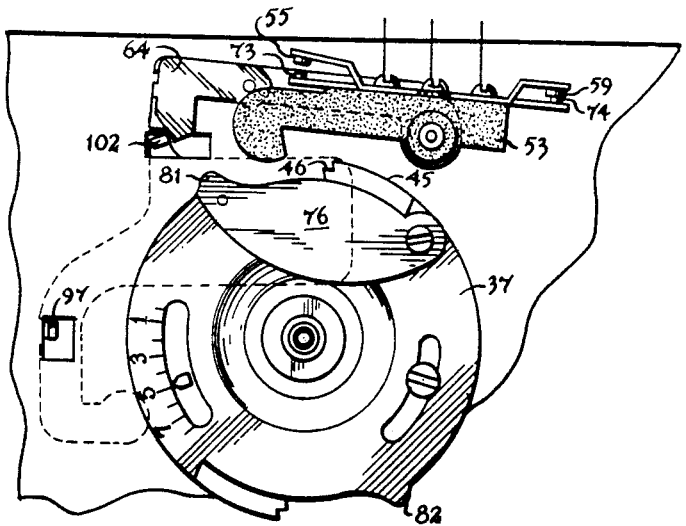
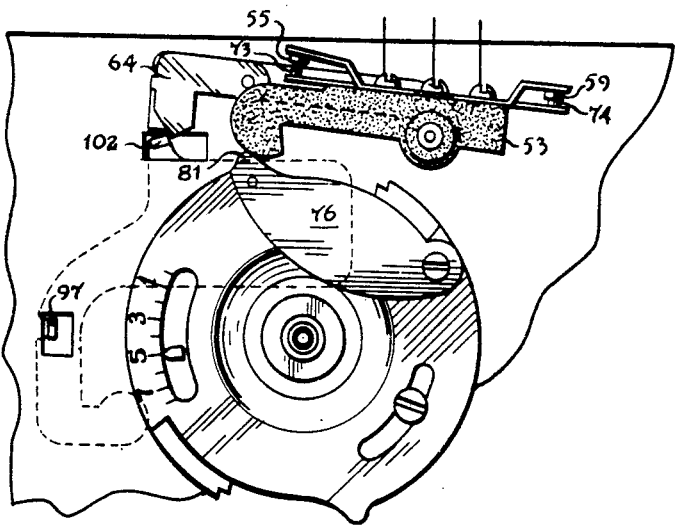

Patented Mar. 11, 1941

2,234,376

UNITED STATES PATENT OFFICE 2,234,376

STOKER CONTROL SYSTEM

Carl G. Kronmiller, Minneapolis, Minn., assignor to Minneapolis-Honeywell Regulator Company, Minneapolis, Minn., a corporation of Delaware Original application June 21, 1937, Serial No. 149,384. Divided and this application May 10, 1939, Serial No. 272,783

12 Claims. (Cl. 236—46)

This invention relates to stoker control systems in general and more particularly to that type of system which utilizes a time operated switching mechanism for maintaining the fire during periods of relatively low heat requirements.

This application is a division of my co-pending application Serial No. 149,384 filed June 21, 1937.

It is an object of this invention to provide an improved stoker control system for obtaining in an improved manner the sequence of control as disclosed in application Serial No. 65,226 filed by Elmer K. Scoggin on February 24, 1936.

The details of construction of the timing arrangement and the cooperation of this timing arrangement with the remaining portion of the system also form objects of this invention.

Other objects and advantages will become apparent to those skilled in the art upon reference to the accompanying specification, claims and drawings.

For a more thorough understanding of this invention, reference is made to the accompanying sheets of drawings in which.

Figures 4, 5, 6, 7, and 8 are fragmentary views showing the relative positions of the parts of the timing mechanism during various periods of operation.

Figure 1:
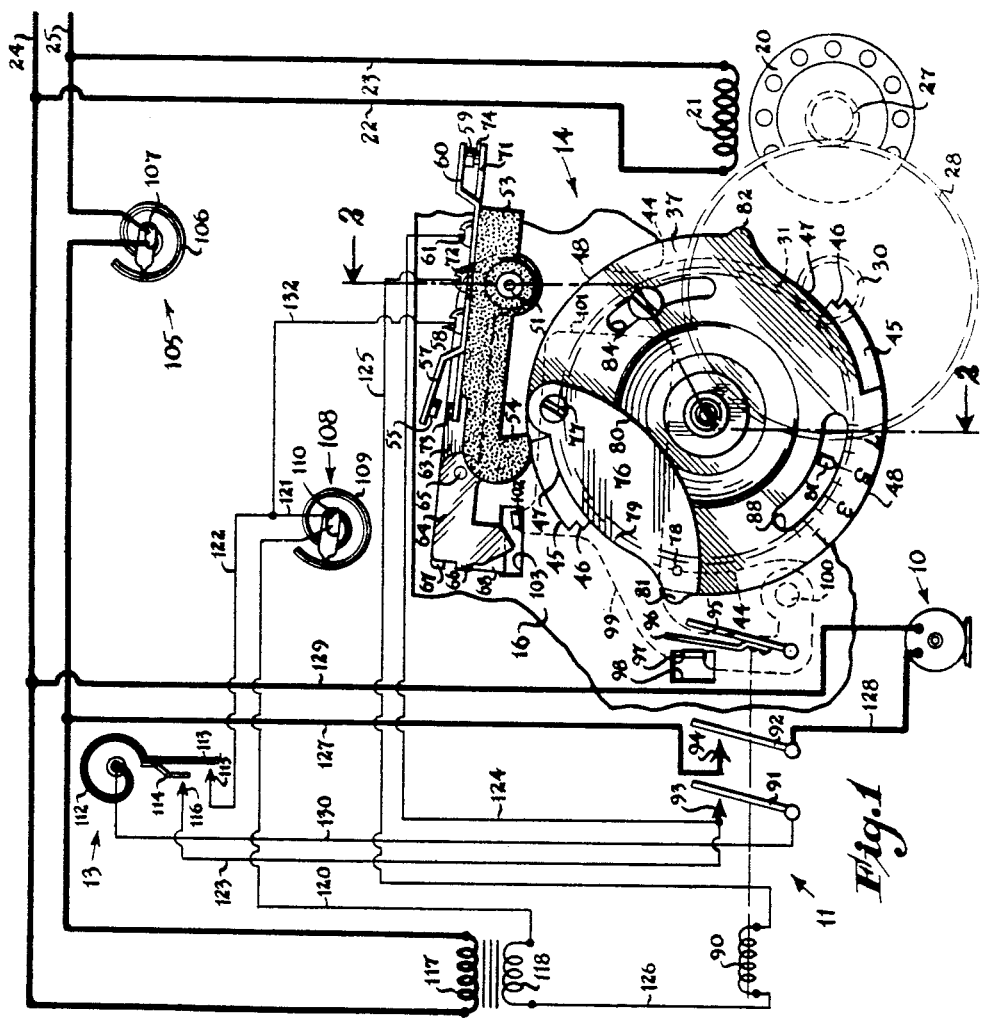
Figure 1 is a fragmentary view of the timing mechanism and a diagrammatic showing of how the timing mechanism is associated with the remaining portion of the control system.
Figure 2:
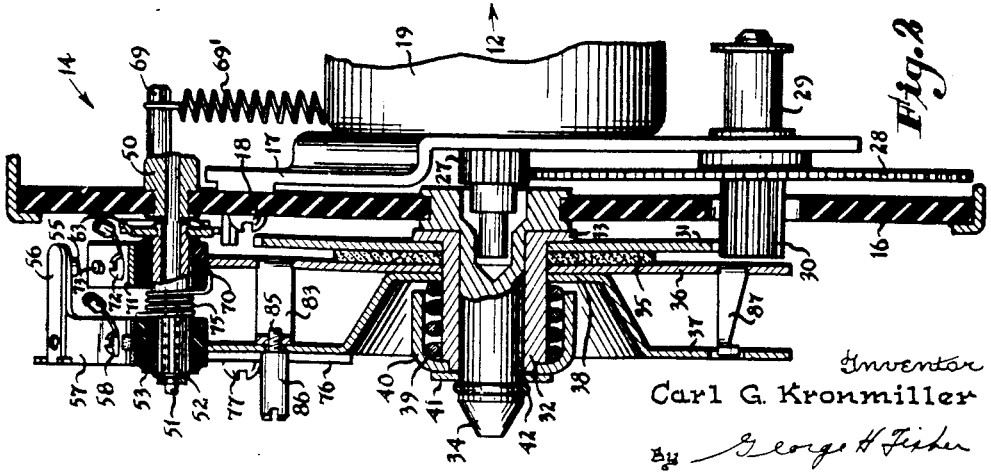
Figure 2 is a sectional view taken substantially along the line 2—2 of Figure 1.

Referring now to Figure 1, 10 designates generally a stoker motor for operating a stoker (not shown) for supplying fuel to a furnace of a heating system. The stoker motor 10 is controlled by a relay, generally designated at 11, and power is supplied to the relay by means of a step-down transformer, generally indicated at 12. The relay 11 is controlled by a condition responsive device which is shown for purposes of illustration to be a space thermostat generally designated at 13. The relay 11 is also controlled by a timing arrangement generally designated at 14. Upon a call for heat the space thermostat 13 pulls in the relay 11 to place the stoker motor 10 in operation and also the timing arrangement 14 periodically pulls in the relay 11 to cause periodic operation of the stoker motor 10. As will be pointed out more fully hereafter, provision is made for preventing operation of the stoker motor 10 by the timing arrangement 14 immediately following a shut-down thereof by the space thermostat 13. Also provision is made for preventing continued operation of the stoker motor 10 following a timed operating period unless the space thermostat is actually demanding heat.

The timing arrangement generally designated at 14 is mounted on a panel 16. On the back side of the panel 16 is secured a bracket 17 as by screws 18 and a constantly operating motor 19 is in turn secured to the bracket 17. The constantly operating motor 19 is shown diagrammatically in Figure 1 to comprise a rotor 20 operated by a field winding 21 which is connected by wires 22 and 23 across line wires 24 and 25. Since the field winding 21 is connected across the line wires 24 and 25, the motor rotor 20 is continuously operated. The motor rotor 20 operates through a reduction gear train (not shown) a pinion 27 which meshes with a gear 28 mounted on a bearing 29. The bearing 29 is preferably carried by the bracket 17. The gear 20 carries a pinion 30 which extends through an opening in the panel 16 and engages a gear 31 mounted on a sleeve 32. The gear 31 abuts a flange 33 formed integrally with the sleeve 32. The sleeve 32 is mounted for rotation on a pin 34 suitably secured to the panel 16. The constantly operating motor 19 and the gears operated thereby are preferably so arranged that the gear 31 is rotated once during every hour.

Abutting the gear 31 is a friction washer 35 and abutting this friction washer 35 is a cam 36. A cam 37 is maintained spaced from the cam 36 by means of a dished out portion 38 in the cam 37. A spring 39 located in a spring retainer cup 40 urges the two cams 37 and 36, the friction washer 35, and the gear 31 in frictional engagement so that upon rotation of the gear 31 the cams 36 and 37 are rotated. The spring retainer cup 40 is riveted to sleeve 32 and the cup 40 and the sleeve 32 are held in position on the pin 34 by means of a washer 41 and a spring clip 42. By reason of this frictional engagement, the cams 36 and 37 may be rotated manually with respect to the gear 31.

The cam 36 is provided with two low diametrically opposed surfaces 44 and two diametrically opposed high surfaces 45. An intermediate surface between the low surface 44 and the high surface 45 is designated at 46. The cam 37 is provided with diametrically opposed low surfaces 47 and diametrically opposed high surfaces 48.

A support 50 is suitably secured to the panel 16 and carries an outwardly projecting pin 51. Mounted for rotation on the pin 51 is a sleeve 52 to which is rigidly secured a lever 53 made of insulating material and provided with a cam follower 54 adapted to engage the high and low surfaces of the cam 37. A contact 55 carried by a bracket 57 is secured to the lever 53 by a screw 58 and also a second contact 59 is secured by a bracket 60 and a screw 61 to the lever 53.

Figure 3:
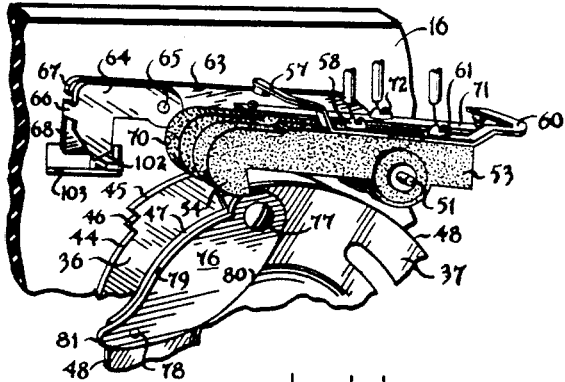
Figure 3 is a perspective view of a portion of the parts shown in Figure 1.

The brackets 57 and 60 are separated from each other as shown in Figure 3 and are therefore electrically insulated from each other since the lever 53 is made of insulating material. The sleeve 52 extends inwardly and is rigidly secured to an arm 63. A lever 64 is pivoted to the arm 63 at 65 and is provided with an abutment 66 located between abutments 67 and 68 formed on the lever 63 whereby a limited movement of the lever 64 is permitted. Gravity normally retains the lever 64 in the position shown in Figure 1. The purpose of the lever 64 and the lever 63 will be pointed out more fully hereafter. The lever 63 is provided with a pin 69 which extends through the panel 16 and which is urged downwardly by a tension spring 69'. The tension spring 69' therefore maintains the cam follower 54 of the lever 53 in engagement with the cam 37.

A second lever 70 formed of insulating material is mounted for rotation on the sleeve 52 and this second lever carries a bracket 71 upon which are mounted contacts 73 and 74. The contacts 73 and 74 are adapted to engage the contacts 55 and 59, respectively. A spring 75 located between the two levers 53 and 70 urges at all times the contact 74 into engagement with the contact 59 and consequently the follower of the lever 70 into engagement with the cam 36.

Figure 4:
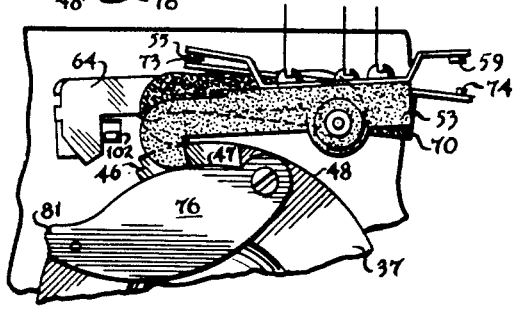
Figure 5:
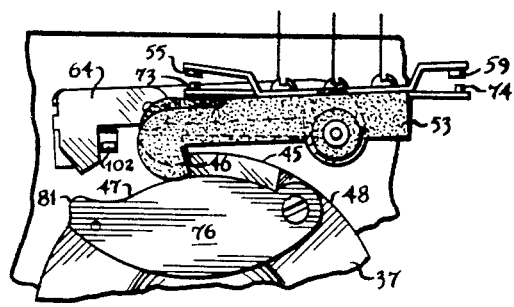
Figure 6:
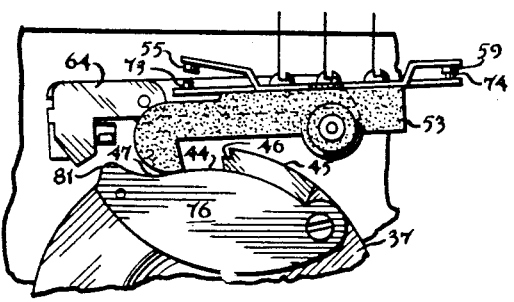

With the parts in the position shown in Figure 1, it is seen that the levers 53 and 70 are engaging the high surfaces 48 and 45 of the cams 37 and 36, respectively, and that the contacts 74 and 59 are in engagement and the contacts 73 and 55 are broken. Upon clockwise rotation of the cams 36 and 37, the cam follower 54 of the lever 53 drops off abruptly from the high surface 48 of the cam 37 to the low surface 47 whereupon the contacts 55 and 73 are engaged with a snap action and the contacts 74 and 59 are broken with snap action. The parts in this position are shown in Figure 4. Upon further clockwise rotation of the cams 36 and 37, the cam follower of the lever 73 drops off of the high surface 45 on to the intermediate surface 46 of the cam 36. In this position both the contacts 55 and 73 and the contacts 59 and 74 are open. The parts are shown in this position in Figure 5. Upon further rotation of the cams, the follower of the lever 70 drops off of the intermediate surface 46 to the low surface 47 to engage the contacts 74 and 59 as shown in Figure 6. As the cams 36 and 37 continue to rotate, the cam follower 54 of the lever 53 rides up an incline from the low surface 47 to the high surface 48 of the cam 37 and since the spring 75 maintains the contacts 74 and 59 in engagement the lever 70 is likewise turned in a clockwise direction as viewed in Figure 1.

From the above it is seen that when the levers 53 and 70 both engage the high surfaces of their respective cams or the low surfaces thereof, the contacts 59 and 74 are closed and the contacts 55 and 73 are open. Howev r, when the lever 53 engages the low surface of its cam and the lever 70 engages the high surface of its cam, the contacts 73 and 55 are closed and the contacts 74 and 59 are open. When the lever 53 engages the low surface 47 and the lever 70 engages the intermediate surface 46, contacts 55 and 73 and contacts 59 and 74 are opened. Since the cams 36 and 37 are provided with diametrically opposed surfaces, two cycles of operation occur every hour. In some instances, it is quite possible that two cycles of operation during each hour may be too often and therefore some means must be provided for readily adjusting the timing mechanism to provide for only one cycle of operation during every hour.

Such an adjustment is provided in this arrangement by a segment 76 mounted on the cam 37 by a screw 77 and a pin 78. The segment 76 is provided with a surface 79 which corresponds with the low surface 47 of the cam 37 and another surface 80 which corresponds with the high surface of the cam 37. By taking out the screw 77 and reversing the segment 76, the high surface 80 of the segment 76 acts as a continuation of the high surfaces 48 of the cam 37 and therefore the lever 53 is only operated once during a complete rotation of the cams 36 and 37. The segment 76 is provided with an abutment 81 and likewise the cam 37 is provided with an abutment 82 which are adapted to engage the cam follower 54 of the lever 53 to tilt the lever 53 an extra amount in a clockwise direction for releasing a latch mechanism which will be pointed out more fully hereafter.

It is not only desirable to adjust the frequency of operation of the switching mechanism but it is also desirable to adjust the duration of time that the various switches are opened and closed. Such an adjustment is accomplished by means of a projection 83 struck up from the cam 36. A slot 84 in the cam 37 is located coextensively with the struck up projection 83. A screw 85 extends through the slot 84 and is screw threaded in the projection 83. The screw 85 holds the cams 30 and 37 fixed with respect to each other. By loosening the screw 85, the cams 36 and 37 may be rotated with respect to each other to provide a means for adjusting the duration of time at which the contacts 73 and 55 are closed. The screw 85 projects outwardly as at 86 to provide a handle for conveniently rotating the cams 36 and 37 through the friction connection with respect to the gear 31. In order to indicate the relative positions of the cams 36 and 37 and consequently the duration of time at which the contacts 73 and 55 are closed, a pointer 87 is struck up from the cam 36 and extends into a slot 88 in the cam 37. Suitable indicia are provided adjacent the slot 88 to coact with the pointer 87 for indicating purposes. As shown in Figure 1, the cams are adjusted with respect to each other to cause the contacts 73 and 55 to be closed for a five minute interval.

The relay generally designated at 11 may comprise a relay coil 90 for operating switch arms 91 and 92 with respect to contacts 93 and 94 and for operating a lever 95 which carries a leaf spring 96. The leaf spring 96 is adapted to engage an abutment 97 which extends through an opening 98 in the panel 16. The abutment 97 is carried by a lever 99 pivoted at 100 and weighted at 101. The lever 99 carries also an abutment 102 which extends through an opening 103 in the panel 16 to engage the lever 64 and the lever 63. Upon energization of the relay coil 90, the switch arms 91 and 92 are moved into engagement with the contacts 93 and 94 and the leaf spring 96 is moved into engagement with the abutment 97 which acts against the weight 101 to move the abutment 102 to the left. Movement of the abutment 102 to the left is permitted by upward movement of the lever 64, and when the abutment 102 assumes its left-hand position it is latched in this position by the link 64. The parts are shown in this position in Figure 7. Downward movement of the lever 63 is therefore prevented. Upon deenergization of the relay coil 90, switch arms 91 and 92 are moved out of engagement with the contacts 93 and 94 and the leaf spring 96 is moved to the right by means of springs, gravity, or other means (not shown). When the leaf spring 96 moves to the right, the lever 99 is maintained latched in its previous position by the lever 64 and will remain in this position until such time as the abutments 81 or 82 carried by the cam 37 shall engage the cam follower 54 to raise the lever 63 upwardly to release the abutment 102 as shown in Figure 8. When the abutment 102 is thus released the weight 101 moves the abutment 102 to the right to the position shown in Figure 1.

A high limit control is generally designated at 105 and may comprise a thermostatic element 106 responsive to the temperature of the gases of combustion for operating a mercury switch 107. The high limit control is preferably adjusted to open the switch 107 whenever the temperature of the gases of combustion reaches a predetermined high dangerous value. This high limit control is connected in series with the stoker motor so that the stoker motor will be shut down whenever abnormal temperature conditions exist within the furnace. A second temperature controller responsive to the temperature of the furnace is generally designated at 108 and may comprise a thermostatic element 109 for operating a mercury switch 110. This temperature controller is preferably made responsive to the temperature of the heating fluid such as the air of a warm air furnace, the supply water of a hot water boiler or the steam of a steam boiler. This instrument is adapted to open the mercury switch 110 whenever the temperature rises to a certain value. A high limit safety control of the temperature changing fluid is therefore provided. The space thermostat is shown to comprise a bimetallic element 112 for operating contacts 113 and 114 with respect to stationary contacts 115 and 116 respectively. Upon a decrease in space temperature the contact 113 engages the contact 115 and upon a further decrease in space temperature the contact 114 engages the contact 116. Preferably the contacts are so arranged that contacts 113 and 115 engage at 72° and the contacts 114 and 116 engage at 70°. The step-down transformer 12 includes a primary 117 and a secondary 118, the primary being connected across the line wires 24 and 25. It is here noted that the high limit control 105 is connected in series with the primary of the step-down transformer, but whenever the temperature of the gases of combustion are normal, power is at all times supplied to the step-down transformer 12.

Assume the parts in the position shown in Figure 1 and assume further that the space temperature decreases to 70° to close contacts 113 and 115 and the contacts 114 and 116. A starting circuit is thereupon completed from the secondary 118 through wire 120, mercury switch 110, wires 121 and 122, contacts 115, 113, 114, and 116, wires 123 and 124, bracket 60, contacts 59 and 74, bracket 71, wire 125, relay coil 90 and wire 126 back to the secondary 118. Completion of this starting circuit energizes the relay coil 90 to move the switch arms 91 and 92 into engagement with the contacts 93 and 94 and to move the leaf spring 96 into engagement with the abutment 97. The abutment 102 is latched by the arm 64 to prevent downward movement of the lever 63 and consequently downwardly movement of the cam follower 54 of the lever 53. Movement of the switch arm 92 into engagement with the contact 94 completes a circuit from the line wire 25 through the high limit control switch 105, wire 127, contact 94, switch arm 92, wire 128, stoker motor 10 and wire 129 back to the other line wire 24. This causes operation of the stoker motor 10. Therefore whenever the relay 11 is pulled in the stoker motor 10 is placed in operation. Movement of the switch arm 91 into engagement with the contact 93 completes a maintaining circuit which may be traced from the secondary 118 through wire 120, switch 110, wires 121 and 122, contacts 115 and 113, bimetallic element 112, wire 130, switch arm 91, contact 93, wire 124, bracket 60, contacts 59 and 74, bracket 71, wire 125, relay coil 90, and wire 126 back to the secondary 118. By reason of this maintaining circuit the relay coil 90 is maintained energized until such time as the space temperature shall rise to 72° to separate the contacts 113 and 115. Since the abutment 102 latches the lever 63 to prevent downward movement of the cam follower 54 it is impossible to separate the contacts 74 and 59 and therefore the stoker motor 10 will remain in operation until the space temperature increases to 72°. When the space temperature increases to 72° the relay coil 90 is deenergized and the switch arms 91 and 92 and the spring 96 are moved to the right whereupon the stoker motor 10 is stopped.

Since the lever 63 is latched by the abutment 102, energization of the relay 11 by the timing mechanism 14 is prevented until such time as either the abutments 81 or 82 operated by the cam 37 shall engage the follower 54 to release the abutment 102. Assume now that the abutment 102 is released and the cams are in the position shown in Figure 1. Upon clockwise rotation of the cams 36 and 37 the follower 54 rides off of the high surface 48 onto the low surface 47 as shown in Figure 4. This causes closing of the contacts 73 and 55 and opening of the contacts 74 and 59. Opening of the contacts 74 and 59 breaks both the starting circuit and the maintaining circuit between relay coil 90 and the space thermostat 13 so that the space thermostat 13 is rendered inoperative to pull in the relay 11. Movement of the contact 55 into engagement with the contact 73 completes a circuit from the secondary 118 through wire 120, switch 110, wires 121 and 132, bracket 57, contacts 55 and 73, wire 125, relay coil 90 and wire 126 back to the secondary 118. Completion of this circuit energizes the relay coil 90 to move the switch arms 91 and 92 into engagement with the contacts 93 and 94 and to move the leaf spring 96 into engagement with the abutment 97. Movement of the switch arm 91 into engagement with the contact 93 has no effect since the contacts 74 and 59 are separated. Movement of the switch arm 92 into engagement with the contact 94 causes operation of the stoker motor 10. Movement of the leaf spring 96 into engagement with the abutment 97 has no effect since as shown in Figure 4 the abutment 102 cannot be moved to the left. The leaf spring 96 therefore performs a strain release function. It follows then that when the relay 11 is energized by the timing arrangement 14 the latch mechanism associated therewith does not operate.

The stoker motor 10 is maintained in operation by the timing mechanism 14 until such time as the cam follower of the lever 70 rides off of the high surface 48 of cam 36 onto the intermediate surface 46. When this occurs the contacts 73 and 55 are separated as are the contacts 74 and 59, this being illustrated in Figure 5. Separation of the contacts 73 and 55 breaks the circuit through the relay coil 90 whereupon the relay 11 drops out to stop operation of the stoker motor 10. Since at this point the contacts 59 and 74 are separated it is impossible to pull in the relay 11 by the action of the space thermostat 13 and the space thermostat 13 cannot control the operation of the relay 11 until such time as the cam follower of the lever 70 rides off of the intermediate surface 46 to the low surface 44, as illustrated in Figure 6. When this occurs the contacts 74 and 59 are made to place the space thermostat back in control of the relay 11.

If the contacts 59 and 74 of the timing arrangement 14 were omitted and a solid connection made between the wires 124 and 125 it would be possible for the space thermostat 13 to maintain the relay 11 energized providing the contacts 113 and 115 were made. Such an operation might cause overheating of the space and therefore the provision of contacts 74 and 59 in the thermostat circuit prevents continued operation of the stoker motor 10 following a timed firing period unless the space temperature is at 70° or below.

By reversing the segment 76 the frequency of operation of the stoker motor 10 by the timing arrangement 14 may be varied as pointed out above. With the segment 76 in the position shown two timed operations of the stoker motor 10 during each hour are provided. By reversing the segment 76 only one timed operation per hour is provided. Although only two sets of cam surfaces are disclosed for giving two operations per hour, any number of sets may be provided such as three or four for giving three or four operations per hour. By suitably adjusting the cams with respect to each other in the manner pointed out above the duration of the timed operation of the stoker motor 10 may be varied. As illustrated, the adjustment provided gives an operating period which may be varied from one minute to seven minutes. Obviously this duration may be increased or decreased as desired.

By reason of the latch arrangement outlined above it is impossible for the timing arrangement 14 to operate the stoker motor 10 immediately following a shut-down upon the space temperature arriving at the desired value of 72°. This effectively prevents overheating which might occur if a timing period were allowed to follow immediately after a shut-down of the stoker motor 10 by the space thermostat.

From the above it is seen that I have provided a control system for a stoker wherein the stoker is controlled by a space thermostat to maintain desired space temperatures, wherein the stoker motor is operated by a timing arrangement to maintain the fire alive under low heat requirement conditions, wherein the frequency of operation and the duration of operation of the stoker by the timing arrangement may be readily adjusted at will, wherein the space thermostat is rendered inoperative to control the stoker motor during the time the stoker is being operated by the timing arrangement and for a short period thereafter, and wherein it is impossible to have a timed operation of the stoker motor immediately following a shut-down by the space thermostat. A novel timing arrangement for accomplishing these functions is provided whereby extreme flexibility of control is obtained.

Although for purposes of illustration one form of this invention has been shown, other forms thereof may become apparent to those skilled in the art upon reference to this specification and therefore this invention is to be limited only by the scope of the appended claims and prior art.

I claim as my invention:

1. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, and means for preventing completion of the second circuit for an appreciable time following opening of the first circuit, said last means being responsive to closing of the first circuit for interrupting normal operation of said second switch and operable by one of said cams after opening of the first circuit to restore normal operation of said second switch.

2. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, and means for preventing completion of the second circuit for an appreciable time following opening of the first circuit, said last mentioned means including releasable latch means operated upon closure of the first circuit for maintaining the second switch opened and means on one of said cams for releasing said latch means.

3. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, a third switch operated by the conjoint action of the cam followers and included in said first circuit, the arrangement being such that the third switch is opened when the second switch is closed, and means carried by one of the cams for maintaining the third switch open momentarily upon opening of the second switch.

4. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, a third switch operated by the conjoint action of the cam followers and included in said first circuit, the arrangement being such that the third switch is opened when the second switch is closed, means carried by one of the cams for maintaining the third switch open momentarily upon opening of the second switch and means for preventing completion of the second circuit for an appreciable time following opening of the first circuit.

5. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer including a pair of concentrically mounted spaced cams, means for rotating the cams at a substantially constant speed and a pair of cam followers operated by the cams, a first switch periodically opened and closed by the cam followers, a second switch operated by the cam followers and maintained momentarily opened following opening of the first switch, and means for completing a circuit through the control winding of the relay and the periodically operated first switch to close periodically the maintaining switch and the load switch to operate periodically the stoker independently of the thermostat, said second switch being included in the maintaining circuit to prevent continued operation of the stoker following a timed operation when only the first to make switch of the thermostat is closed.

6. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, and means operable upon closure of the first circuit for interrupting normal operation of the second switch and maintaining the second switch opened for an appreciable time following opening of the first circuit.

7. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, means operable upon closure of the first circuit cooperating with one of the cam followers for interrupting normal operation of said second switch, said last means being operable by one of the cams after opening of said first circuit whereby normal operation of said second switch is resumed.

8. In a heating system having a stoker, the combination of, electrically operated means for controlling the operation of the stoker, a first switch operated in response to a condition indicative of a demand for heat, a first circuit including the electrically operated means and the first switch for controlling the operation of the stoker, a second switch, a pair of concentrically mounted spaced cams, means for rotating the cams at a substantially constant speed, a pair of cam followers operated by the cams for conjointly opening and closing the second switch, a second circuit including the electrically operated means and the second switch for causing periodic operation of the stoker, a third switch operated by the conjoint action of the cam followers and included in said first circuit, the arrangement being such that the third switch is opened when the second switch is closed, means carried by one of the cams for maintaining the third switch open momentarily upon opening of the second switch, means operable upon closure of the first circuit for operating one of the cam followers to interrupt normal operation of the second switch, and means on one of the cams for operating one of the cam followers to allow closing of the second switch an appreciable time after opening of the first circuit.

9. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer including a pair of concentrically mounted spaced cams, means for rotating the cams at a substantially constant speed and a pair of cam followers operated by the cams, a switch periodically opened and closed by the cam followers, means for completing a circuit through the control winding of the relay and the periodically operated switch to close periodically the load switch to operate periodically the stoker independently of the thermostat, and means operable upon energization of the control winding of the relay by the space thermostat for interrupting normal operation of the timer operated switch and maintaining the timer operated switch opened for an appreciable time following deenergization of the control winding of the relay by the space thermostat.

10. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer including a pair of concentrically mounted spaced cams, means for rotating the cams at a substantially constant speed and a pair of cam followers operated by the cams, a switch periodically opened and closed by the cam followers, means for completing a circuit through the control winding of the relay and the periodically operated switch to close periodically the load switch to operate periodically the stoker independently of the thermostat, means operable upon energization of the control winding of the relay by the space thermostat for operating one of the cam followers to interrupt normal operation of the timer operated switch, and means on one of the cams for operating one of the cam followers to allow closing of the timer operated switch an appreciable time after deenergization of the control winding of the relay by the space thermostat.

11. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer including a pair of concentrically mounted spaced cams, means for rotating the cams at a substantially constant speed and a pair of cam followers operated by the cams, a first switch periodically opened and closed by the cam followers, a second switch operated by the cam followers and maintained momentarily opened following opening of the first switch, means for completing a circuit through the control winding of the relay and the periodically operated first switch to close periodically the maintaining switch and the load switch to operate periodically the stoker independently of the thermostat, said second switch being included in the maintaining circuit to prevent continued operation of the stoker following a timed operation when only the first to make switch of the thermostat is closed, and means operable upon energization of the control winding of the relay by the space thermostat for interrupting normal operation of the first timer operated switch and maintaining the first timer operated switch opened for an appreciable time following deenergization of the control winding of the relay by the space thermostat.

12. In a heating system for a space having heating means for the space and a stoker for firing the heating means, the combination of, a relay having a control winding, a maintaining switch and a load switch for the stoker, the maintaining switch and the load switch being closed when the control winding is energized, a space thermostat having a pair of switches that are sequentially closed upon a decrease in space temperature, means for completing a starting circuit through the control winding of the relay and the last to close switch of the thermostat to close the maintaining switch and the load switch for starting operation of the stoker, means for completing a maintaining circuit through the control winding of the relay, the first to close switch of the thermostat and the maintaining switch to maintain the load switch closed and the stoker in operation until the first to close switch of the thermostat is opened, a timer including a pair of concentrically mounted spaced cams, means for rotating the cams at a substantially constant speed and a pair of cam followers operated by the cams, a first switch periodically opened and closed by the cam followers, a second switch operated by the cam followers and maintained momentarily opened following opening of the first switch, means for completing a circuit through the control winding of the relay and the periodically operated first switch to close periodically the maintaining switch and the load switch to operate periodically the stoker independently of the thermostat, said second switch being included in the maintaining circuit to prevent continued operation of the stoker following a timed operation when only the first to make switch of the thermostat is closed, means operable upon energization of the control winding of the relay by the space thermostat for operating one of the cam followers to interrupt normal operation of the first timer operated switch, and means on one of the cams for operating one of the cam followers to allow closing of the first timer operated switch an appreciable time after deenergization of the control winding of the relay by the space thermostat.

CARL G. KRONMILLER.